United States Patent
Nakamura et al.

[11] Patent Number: 6,095,217
[45] Date of Patent: Aug. 1, 2000

[54] PNEUMATIC TIRE INCLUDING CAP LAYER AND BASE LAYER

[75] Inventors: Eiji Nakamura; Naohiro Sasaka; Masayuki Ohashi, all of Tokyo, Japan

[73] Assignee: Bridgestone Corporation, Tokyo, Japan

[21] Appl. No.: 08/890,753

[22] Filed: Jul. 11, 1997

[30] Foreign Application Priority Data

| Jul. 11, 1996 | [JP] | Japan | 8-182393 |
| Jul. 12, 1996 | [JP] | Japan | 8-183669 |
| Jul. 12, 1996 | [JP] | Japan | 8-183831 |

[51] Int. Cl.[7] ............... B60C 1/00; B60C 11/00
[52] U.S. Cl. ............... 152/209.5; 152/209.18; 152/905
[58] Field of Search ............... 152/209 R, 209.5, 152/905, 902, 209.18; 524/492, 493, 495, 496

[56] References Cited

U.S. PATENT DOCUMENTS

| 2,445,725 | 7/1948 | Walker | 152/209 R |
| 3,768,537 | 10/1973 | Hess et al. | 152/209.5 |
| 4,381,810 | 5/1983 | Cady et al. | 152/209 R |
| 4,519,431 | 5/1985 | Yoshimura et al. | 152/905 |
| 4,603,722 | 8/1986 | Oshima et al. | 152/209.5 |
| 5,309,963 | 5/1994 | Kakumu et al. | 152/902 |
| 5,393,821 | 2/1995 | Shreh et al. | 524/495 |
| 5,720,831 | 2/1998 | Aoki et al. | 152/209 R |
| 5,810,953 | 9/1998 | Tanaka et al. | 152/209 R |

FOREIGN PATENT DOCUMENTS

| 56-139542 | 10/1981 | Japan . |
| 58-87138 | 5/1983 | Japan . |
| 59-70205 | 4/1984 | Japan . |
| 3-7602 | 1/1991 | Japan | 152/209 R |
| 3-252431 | 11/1991 | Japan . |
| 5-271477 | 10/1993 | Japan . |
| 05 331 316 | 12/1993 | Japan . |
| 06 191 221 | 7/1994 | Japan . |
| 1255952 | 12/1971 | United Kingdom | 152/209 R |
| 2058687 | 4/1981 | United Kingdom | 152/209 R |

OTHER PUBLICATIONS

Translation for Japan 3–7602.
Science and Technology of Rubber, pp. 432–439., 1994.
Abstracts for Japan 59–70205, Japan 5–331316, Japan 56–139542, Japan 3–252431, Japan 5–271477, Japan 6–191221 and Japan 58–87138.

*Primary Examiner*—Steven D. Maki
*Attorney, Agent, or Firm*—Sughrue, Mion, Zinn, Macpeak & Seas, PLLC

[57] ABSTRACT

A pneumatic tire comprising a tread which contacts a road surface and comprises a rubber composition which contains a rubber component composed of 70% by weight or more of a copolymer of a conjugated diene and a vinyl aromatic hydrocarbon and a remaining amount of another synthetic rubber and/or natural rubber, at least one reinforcing filler selected from a group consisting of carbon black and silica, and at least one type of vulcanization accelerator, such as bis(4-methylbenzothiazolyl-2)-disulfide, bis(5-methylbenzothiazolyl-2)-disulfide, mercapto-4-methylbenzothiazole, and mercapto-5-methylbenzothiazole, an amount of the reinforcing filler being 45 to 120 parts by weight and an amount of the vulcanization accelerator being 0.5 to 5.0 parts by weight per 100 parts by weight of the rubber component. Decrease in chipping resistance during tire use is suppressed, and both abrasion resistance and controllability on wet roads after use of the tire are improved.

18 Claims, 2 Drawing Sheets

FIG. 2

PNEUMATIC TIRE INCLUDING CAP LAYER AND BASE LAYER

BACKGROUND OF THE INVENTION

1. Field of the Invention

The present invention relates to a pneumatic tire, and more particularly to a pneumatic tire which uses a specific rubber composition in the tread and exhibits excellent performance by simultaneously achieving improvement in both controllability on wet roads (wet-road property) and chipping resistance of the tread (blockwise tread rubber dropout). The present invention also relates to a pneumatic tire which has a tread structure composed of a cap layer and a base layer and shows a suppressed decrease in the wet-road property and improved quality to vibration in a car ride (ride quality) throughout the entire period of tire use.

2. Description of the Related Art

It has heretofore been known that simultaneous improvement in abrasion resistance and the wet-road property is enabled by using a high-structure carbon black in a rubber composition for a tire tread.

The market requires a further increase in abrasion resistance. It is difficult, however, to achieve a further increase in abrasion resistance through the conventional method of using a specific type of carbon black because an increase in the amount of carbon black decreases breaking energy, which is defined as the integral of a stress-strain curb up to the elongation where the sample breaks, in later periods of tire use. Moreover, this method has another problem in that the wet-road property is weakened because of the hardening of rubber composition in later periods of tire use, and this method has been found to be insufficient for maintaining properties during the entire period of tire use. It is proposed in Japanese Patent Application Laid-Open (JP-A) No. 58-87138 that the appearance in the final period of tire use can be improved by suppressing the aging of tread rubber composition and sidewall rubber composition by using a rubber composition comprising a combination of a specific antioxidant and a specific vulcanization accelerator. However, nothing is mentioned about improvement of chipping resistance and the wet-road property in later periods of tire use. In JP-A No. 56-139542, a specific vulcanization accelerator is proposed and improvement of the workability of a rubber composition by using this vulcanization accelerator is described. However, a tire using this rubber composition has not been examined.

On the other hand, the effective vulcanization system is known as a method of suppressing the hardening of 9 rubber composition. The effect of suppressing the hardening of rubber composition is insufficient, however, and the breaking energy is decreased. Therefore, this method is not preferable with respect to tire durability.

Technologies for improving the balance between the wet-road property and rolling resistance by adding silica into a rubber composition for a tire tread are disclosed in JP-A Nos. 3-252431 and 5-271477. However, it is found by the studies conducted by the present inventors that the chipping resistance of a tire, particularly in the final period of tire use, is decreased by using silica. Methods known for improving chipping resistance include decreasing the tensile stress and the gripping property of a rubber composition. These methods cannot actually be applied, however, because the decrease in the tensile stress causes a decrease in controllability. The chipping of a tread, i.e., blockwise tread rubber dropout, in later periods of tire use is caused by a decrease in the breaking energy of the tread rubber composition. It was found by an analysis of the tread rubber composition after the tire has been used conducted by the present inventors that the hardening phenomenon takes place by heat aging of a tread rubber composition, and the breaking energy is decreased because of the phenomenon. It was also found that the main cause for the hardening phenomenon is additional cross-linking by sulfur and vulcanization accelerators remaining in the rubber composition. This hardening phenomenon causes the additional problem that the wet-road property is weakened in later periods of tire use. Therefore, maintaining properties during the entire period of tire use is another subject for improvement.

SBR having a high content of styrene, and/or silica are used for a tread rubber composition which contacts a road surface in order to improve the wet-road property of a pneumatic tire. The tread rubber composition is softened to improve ride quality. In accordance with these methods, the wet-road property and ride quality in the initial period of tire use can be improved, although, these properties are weakened in the intermediate to, final periods of tire use.

For overcoming this problem, in a method disclosed in JP-A No. 59-70205, for example, different rubber compositions are used for the cap layer and the base layer of a tread to maintain the properties by exposure of the base layer as abrasion of the tread proceeds. However, this method has a problem that the base layer has been exposed to heat and deformation within the tread and the base layer rubber composition has already aged by the time the base layer is exposed to the surface of the tread, so that the desired properties cannot be exhibited.

A method disclosed in JP-A No. 58-87138 is known to improve the appearance in the final period of tire use by suppressing the aging of rubber composition in tread and sidewalls, which are exposed to the surface. Nothing is mentioned, however, about the effect of a base rubber used at the inside of a tread. Neither, the wet-road property nor ride quality is mentioned or suggested.

SUMMARY OF THE INVENTION

Accordingly, an object of the present invention is to provide a pneumatic tire having an improved abrasion resistance and an improved wet-road property in later periods of tire use simultaneously by improving the properties of the tread rubber composition of a pneumatic tire which has not been achieved by conventional technologies.

Another object of the present invention is to suppress the decrease in chipping resistance during the use and to improve the wet-road property in later periods of tire use by suppressing the additional cross-linking reaction and preventing the occurrence of the hardening phenomenon and decrease in breaking energy.

An object of the other aspect of the present invention is to provide a pneumatic tire which can simultaneously improve chipping resistance and the wet-road property in later periods of tire use by improving the properties of the tread rubber composition of a pneumatic tire which has not been achieved by using conventional technology.

Another object of the other aspect of the present invention is to provide a pneumatic tire having a stable wet-road property and stable ride quality in the intermediate to final period of tire use as well as in the initial period.

Other objects and advantages of the present invention will be apparent to the skilled in the art upon consideration of the following description.

The present inventors discovered that the objects can be achieved by compounding specific amounts of carbon black and/or silica as a reinforcing filler with a specific diene rubber and using a vulcanization accelerator represented by a specific formula in the tread rubber composition of a pneumatic tire.

Accordingly, the present invention provides:

(1) a pneumatic tire comprising a tread which contacts a road surface, a carcass which is a reinforcing component, and bead cores around which end parts of the carcass are folded to fix the end parts in place and which define the inner dimension of the pneumatic tire,
wherein the tread comprises a rubber composition which comprises a rubber component composed of 70% by weight or more of a copolymer of a conjugated diene and a vinyl aromatic hydrocarbon and a remaining amount of another synthetic rubber and/or natural rubber, at least one reinforcing filler selected from a group consisting of carbon black and silica, and at least one type of vulcanization accelerator represented by one of the following general formula (I):

wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom, the amount of the reinforcing filler being 45 to 120 parts by weight and the amount of the vulcanization accelerator being 0.5 to 5.0 parts by weight per 100 parts by weight of the rubber component, (2) when $R^1$ or $R^2$ represents an alkyl group, the alkyl group is preferably selected from alkyl groups having 1 to 6 carbon atoms and is more preferably a methyl group or an ethyl group, (3) when $R^1$ or $R^2$ represents an aryl group, the aryl group is preferably selected from aryl groups having 6 to 10 carbon atoms and is more preferably a phenyl group, (4) the vulcanization accelerator is preferably at least one type selected from a group consisting of bis(monoalkylbenzothiazolyl-2)-disulfides and 2-mercapto-monoalkylbenzothiazoles. When the vulcanization accelerator is a bis(monoalkylbenzothiazolyl-2)-disulfide, the bis(monoalkylbenzothiazolyl-2)-disulfide is preferably at least one type selected from a group consisting of bis(4-methylbenzothiazolyl-2)-disulfide and bis(5-methylbenzothiazolyl-2)-disulfide. When the vulcanization accelerator is a 2-mercapto-monoalkylbenzothiazole, the 2-mercapto-monoalkylbenzothiazole is preferably at least one type selected from a group consisting of 2-mercapto-4-methylbenzothiazole and 2-mercapto-5-methylbenzothiazole, (5) as the reinforcing filler, carbon black alone, silica alone, or a combination of a carbon black and a silica are preferably used, (6) when a carbon black is used, the carbon black preferably has a specific surface area measured by nitrogen adsorption ($N_2SA$) of 80 to 160 $m^2/g$ and an amount of absorption of dibutyl phthalate (DBP absorption) of 110 to 200 $cm^3/100$ g, more preferably a specific surface area measured by nitrogen adsorption ($N_2SA$) of 100 to 160 $m^2/g$ and an amount of absorption of dibutyl phthalate (DBP absorption) of 120 to 200 $cm^3/100$ g, (7) when the reinforcing filler comprises a carbon black, the carbon black preferably has a specific surface area measured by $N_2SA$ of 100 to 150 $m^2/g$ and an amount of DBP absorption of 130 to 180 $cm^3/100$ g, (8) when the reinforcing filler comprises a carbon black and a silica, it is preferable that the total amount of the reinforcing filler is 60 to 120 parts by weight per 100 parts by weight of the rubber component, content of the silica is 20% to 100% by weight of the total amount of the reinforcing filler, or the silica has a specific surface area measured by $N_2SA$ of 190 to 300 $m^2/g$, (9) the content of the vinyl aromatic hydrocarbon in the copolymer of a conjugated diene and a vinyl aromatic hydrocarbon is preferably 30% to 40% by weight of the copolymer, and (10) it is preferable that the tread is composed of a cap layer disposed at the outside in a radial direction and a base layer disposed at the inside in a radial direction, rubber compositions of the cap layer and of the base layer are different from each other, the rubber composition of the base layer comprises the rubber composition described in any of (1) to (9), and the upper end of the rubber base layer is disposed at a height from the bottom of a groove of a block in a range of 40% to 80% of a distance from the bottom of the groove to the top of the block.

The present inventors analyzed the aging phenomenon of a base layer in a tread in detail and discovered the other aspect of the present invention on the basis of the novel knowledge that, unlike a cap layer exposed to the surface, the main cause of the aging of a base rubber composition is not vaporization of oil or oxidation of oil by oxygen in the air or ozone but a change in the cross-linking caused by sulfur or vulcanization accelerator remaining in the rubber composition, and this change is related to the wet-road property and ride quality.

In accordance with the other aspect of the present invention, a pneumatic tire is provided which comprises a tread composed of a cap layer disposed at the outside in a radial direction and a base layer disposed at the inside in a radial direction, rubber compositions of the cap layer and the base layer are different from each other, wherein the upper end of the base layer is disposed at a height from the bottom of a groove of a block in a range of 40% to 80% of a distance from the bottom of the groove to the top of a block, and the rubber composition of the base layer comprises a vulcanization accelerator represented by general formula (I) ($R^1$ and $R^2$ are as defined above in (1) to (3), and the preferable compounds are described in (4)), in an amount of 0.5 to 5.0 parts by weight per 100 parts by weight of a rubber component of the rubber composition of the base layer. This pneumatic tire exhibits the excellent effect that the tire has the wet-road property and ride quality at high levels with stability till the final period of tire use.

BRIEF DESCRIPTION OF THE DRAWINGS

In the figures, 10 indicates a block, 12 indicates a base layer, 14 indicates a cap layer, 16 indicates another base layer, t indicates the distance from the bottom to the surface of a block, and h indicates the height from the bottom of a block to the upper end of the rubber base layer.

DETAILED DESCRIPTION OF THE INVENTION

In the pneumatic tire of the present invention, the rubber composition comprised in the tread comprises a rubber component containing 70% by weight or more of a copolymer of a conjugated diene and a vinyl aromatic hydrocarbon, 45 to 120 parts by weight of a reinforcing filler selected from the group consisting of a carbon black and a silica, and 0.5 to 5.0 parts by weight of the above vulcanization accelerator represented by general formula (I) per 100 parts by weight of the rubber component.

The rubber component, as the major material comprised in the rubber composition, is described below. It is necessary that the rubber component comprised in the tread of the pneumatic tire of the present invention contains 70% by weight or more of a copolymer of a conjugated diene and a vinyl aromatic hydrocarbon. When the amount of the copolymer of a conjugated diene and a vinyl aromatic hydrocarbon in the rubber component is less than 70% by weight, the desired controllability cannot be obtained, and the wet-road property is decreased, particularly in the initial period of tire use. Thus, such an amount is not preferable.

The preferable conjugated diene is a conjugated diene monomer having 4 to 12 carbon atoms, more preferably 4 to 8 carbon atoms, in one molecule. Specific examples include 1,3-butadiene, isoprene, 2,3-dimethyl-1,3-butadiene, 1,3-pentadiene, and octadiene. The conjugated diene can be used solely or in combination of two or more. Among these compounds, 1,3-butadiene, which provides a copolymer having excellent abrasion resistance, is particularly preferable.

Specific examples of the vinyl aromatic hydrocarbon monomer which is copolymerized with the conjugated diene monomer include styrene, α-methylstyrene, p-methylstyrene, o-methylstyrene, p-butylstyrene, vinylnaphthalene, and derivetives thereof. Among these compounds, styrene is particularly preferable.

The process for producing the copolymer of a conjugated diene and a vinyl aromatic hydrocarbon is not particularly limited, and the conjugated diene and the vinyl aromatic hydrocarbon can be copolymerized, for example, by solution polymerization using an organolithium compound, by emulsion polymerization, or by suspension polymerization.

As the copolymer, a copolymer of butadiene and styrene (hereinafter, referred to as SBR) having excellent abrasion resistance and excellent resistance to aging is preferable. The microstructure (a structure having cis-1,4, trans-1,4, and vinyl structures) of the butadiene part of the copolymer of butadiene and styrene is not particularly limited. The microstructure can generally be in a range which is generally obtained by using an organolithium initiator.

The composition of the copolymer of a conjugated diene and a vinyl aromatic hydrocarbon, such as SBR, is not particularly limited. The content of the vinyl aromatic hydrocarbon is preferably 20% to 80%, and more preferably 30% to 40% by weight. When the content of a vinyl aromatic hydrocarbon is less than 20% by weight, a sufficient gripping property on dry and wet roads cannot always be obtained, and when the content of a vinyl aromatic hydrocarbon is more than 40% by weight, abrasion resistance tends to be decreased.

As for the distribution of a conjugated diene and a vinyl aromatic hydrocarbon in the copolymer, any of a random structure, a block structure, or an intermediate structure may be used. A random structure or an intermediate structure is preferable.

In the present invention, it is necessary that the rubber component used as the major material of the rubber composition comprises 70% by weight or more of the copolymer of a conjugated diene and a vinyl aromatic hydrocarbon. It is more preferable in view of effect that the rubber component comprises 80% by weight or more of the copolymer. The rubber component may also comprise 100% of the copolymer of a conjugated diene and a vinyl aromatic hydrocarbon.

As another rubber component which can be used in combination with the above copolymer of a conjugated diene and a vinyl aromatic hydrocarbon which is comprised in the tread rubber composition of the pneumatic tire of the present invention, natural rubber or a synthetic rubber, such as isoprene rubber, butadiene rubber, butyl rubber (including halogenated butyl rubber), and ethylene-propylene rubber, can be used. The above rubber component may be used in a desired amount less than 30% by weight within the range in which the effect of the present invention is not adversely affected. These component can be used solely or in combination of two or more.

The tread rubber composition of the pneumatic tire of the present invention comprises a carbon black and/or a silica as the reinforcing filler.

When a carbon black alone is comprised as the reinforcing filler, a carbon black having specific properties is comprised in an amount of 45 to 120 parts by weight, and preferably 45 to 110 parts by weight, per 100 parts by weight of the above rubber component. When the amount of the carbon black is within this range, the effect of improving the properties of the tire is increased. When the amount of the carbon black used is less than 45 parts by weight, it is difficult to ensure with certainty that controllability (properties on dry or wet roads) in the initial period will be obtained. When the amount exceeds 120 parts by weight, abrasion resistance is decreased, and workability in production may deteriorate.

The type of carbon black used in the present invention is not particularly limited, and conventional types of carbon black generally used in a rubber composition for a tire tread can be used. It is preferable that carbon black having $N_2SA$ measured in accordance with ASTM D3037 of 80 to 160 $m^2/g$, preferably 100 to 160 $m^2/g$, and a DBP absorption measured in accordance with ASTM 2414 of 110 to 200 $cm^2/100$ g, preferably 120 to 200 $cm^2/100$ g, is selected from among such types of carbon black. It is more preferable that carbon black has $N_2SA$ of 100 to 150 $m^2/g$ and a DBP absorption of 130 to 180 $cm^3/100$ g. When a carbon black having $N_2SA$ smaller than 80 $m^2/g$ is used, it is difficult to ensure that the stiffness of the tread will be maintained. When a carbon black having $N_2SA$ larger than 160 $m^2/g$ is used, a problem may arise in that durability is decreased by inferior heat buildup property. When a carbon black having DBP absorption of smaller than 110 $cm^3/100$ g is used, it is difficult to maintain the stiffness of the tread. When a carbon black having DBP absorption larger than 200 $cm^3/100$ g is used, deterioration in workability and a marked increase in the tensile stress may occur. ISAF (in accordance with the former classification of ASTM), which is a conventional type of carbon black, generally has $N_2SA$ of 116 to 125 $m^2/g$ and DBP absorption of 78 to 126 $cm^3/100$ g. Because DBP absorption is relatively small, it is difficult to ensure that the desired effect of the present invention will be exhibited by using this type of carbon black as a component.

When both a carbon black and a silica are comprised as the reinforcing filler, the tread rubber composition of the pneumatic tire of the present invention comprises the reinforcing filler in a total amount of 45 to 120 parts by weight, preferably 60 to 120 parts by weight, per 100 parts by weight of the rubber component, and the effect of improving properties is remarkably increased. When the total amount of the reinforcing filler comprised in the rubber composition is within a range of 60 to 120 parts by weight, this amount is advantageous for increasing both abrasion resistance and chipping resistance in final periods of tire use. The amount is more preferably 60 to 100 parts by weight.

The preferable content of the silica is in a range of 20% to 100% by weight of the total amount of the reinforcing filler. When the content is less than 20% by weight, the wet-road property is inferior.

When a carbon black and a silica are comprised as the reinforcing filler, preferably the carbon black has $N_2SA$ measured in accordance with ASTM D3037 of 80 to 160 $m^2/g$, more preferably 100 to 160 $m^2/g$, and DBP absorption measured in accordance with ASTM D2414 of 110 to 200 $cm^3/100$ g, more preferably 120 to 200 $cm^3/100$ g. More preferably, the carbon black has $N_2SA$ of 100 to 150 $m^2/g$ and DBP absorption of 130 to 180 $cm^3/100$ g.

Silica comprised in the rubber composition preferably has $N_2SA$ in a range of 190 to 300 $m^2/g$. When silica has $N_2SA$ less than 190 $m^2/g$, abrasion resistance is inferior. When silica has $N_2SA$ exceeding 300 $m^2/g$, workability in handling of the rubber composition is inferior. Thus, such an amount is not preferable. Using a coupling agent for silica combination with silica is preferable for improving properties.

The vulcanization accelerator used in the present invention is a vulcanization accelerator represented by general formula (I). The vulcanization accelerator is comprised in the rubber composition in an amount of 0.5 to 5.0 parts by weight per 100 parts by weight of the rubber component. When the amount is less than 0.5 parts by weight, the effect of suppressing the decrease in breaking energy is insufficient. In other words, the effect of increasing abrasion resistance and chipping resistance is insufficient. Therefore, a decrease in the hardness by the use and decrease in the wet-road property in later periods of tire use cannot be suppressed. When the amount exceeds 5 parts by weight, no further increase in the effect can be found, and increasing the amount above the specified range is not preferable from the standpoint of economy. Moreover, chipping resistance is decreased because of an excessively high modulus of elasticity when the amount exceeds 5 parts by weight.

In general formula (I), $R^1$ and $R^2$ each independently represent a hydrogen atom, an alkyl group, or an aryl group, preferably a hydrogen atom, an alkyl group having 1 to 6 carbon atoms, or an aryl group having 6 to 10 carbon atoms, more preferably a hydrogen atom, a methyl group, an ethyl group, or a phenyl group, excluding a case in which each of $R^1$ and $R^2$ simultaneously represents a hydrogen atom.

Specific examples of the vulcanization accelerator include 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, 2-mercapto-6-ethylbenzothiazole, 2-mercapto-4,5-dimethylbenzothiazole, 2-mercapto-4,5-diethylbenzothiazole, 2-mercapto-4-phenylbenzothiazole, 2-mercapto-5-phenylbenzothiazole, 2-mercapto-6-phenylbenzothiazole, bis(4-methylbenzothiazolyl-2)-disulfide, bis(4-ethylbenzothiazolyl-2)-disulfide, bis(5-methylbenzothiazolyl-2)-disulfide, bis(5-ethylbenzothiazolyl-2)-disulfide, bis(6-methylbenzothiazolyl-2)-disulfide, bis(6-ethylbenzothiazolyl-2)-disulfide, bis(4,5-dimethylbenzothiazolyl-2)-disulfide, bis(4,5-diethylbenzothiazolyl-2)-disulfide, bis(4-phenylbenzothiazolyl-2)-disulfide, bis(5-phenylbenzothiazolyl-2)-disulfide, and bis(6-phenylbenzothiazolyl-2)-disulfide, and the like.

Among these compounds, bis(monoalkylbenzothiazolyl-2)-disulfides and 2-mercapto-monoalkylbenzothiazoles are preferable, and bis(4-methylbenzothiazolyl-2)-disulfide, bis(5-methylbenzothiazolyl-2)-disulfide, 2-mercapto-4-methylbenzothiazole, and 2-mercapto-5-methylbenzothiazole are even more preferable. These vulcanization accelerations can be used solely or in combination of two or more.

The process for producing the vulcanization accelerator is not particularly limited. For example, the vulcanization accelerator can easily be produced in accordance with the process described in JP-A No. 49-93361.

In the rubber composition used for tread of the pneumatic tire of the present invention, components generally used in rubber compositions for tires, such as coupling agents for silica, vulcanizing agents, softeners, zinc oxide, stearic acid, and antioxidant or antiozonants as antiaging agents can suitably be comprised within a range in which the effect of the present invention is not adversely affected.

Sulfur can be used as the vulcanizing agent. The amount of the vulcanizing agent is 0.1 to 5 parts by weight as sulfur, preferably 0.5 to 2 parts by weight, more preferably 1 to 2 parts by weight, per 100 parts by weight of the rubber component. When the amount is less than 0.1 part by weight, the tensile strength and the abrasion resistance of the vulcanized rubber are decreased. When the amount exceeds 5 parts by weight, rubber elasticity tend to decrease.

The rubber composition in the present invention can be obtained by mixing the components using a mixing machine, such as a roller, an internal mixer, and a Bambury mixer. The rubber composition is vulcanized after forming and used for a tire tread or an undertread which constitutes the pneumatic tire of the present invention.

Figure 1:
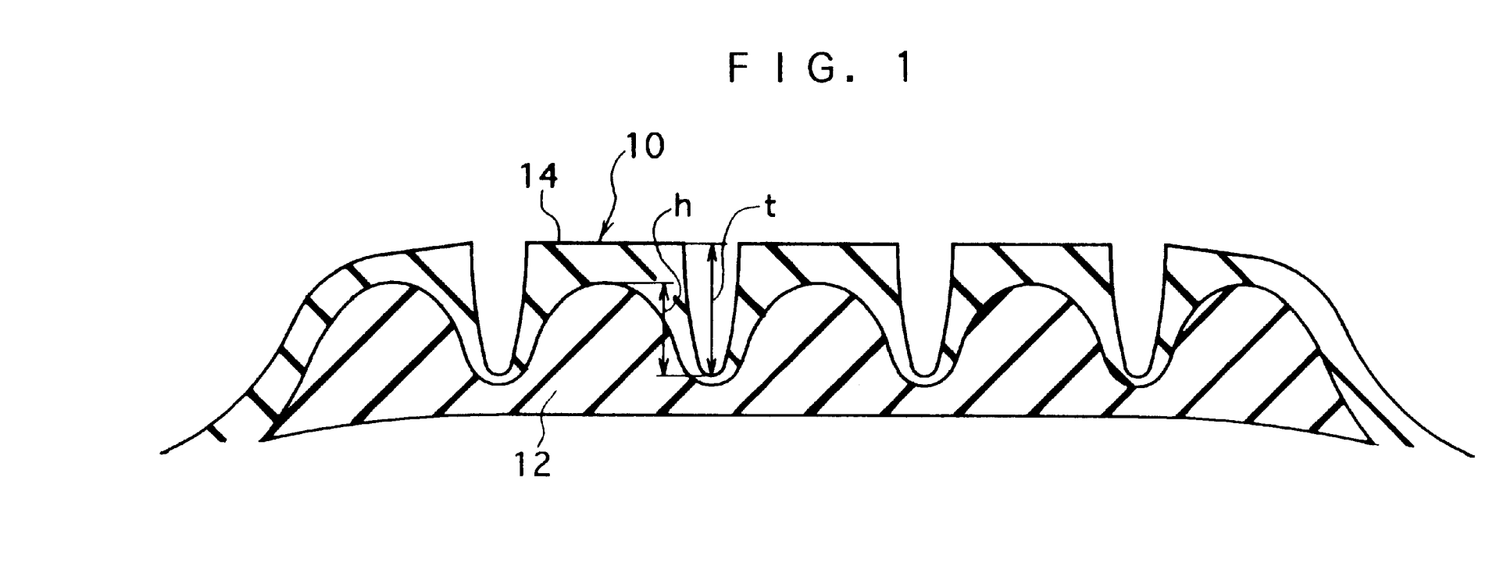
FIG. 1 shows a schematic sectional view of an example of the tread of the pneumatic tire of the present invention.

In accordance with the other aspect of the present invention, it is preferable that the upper end of the base layer which comprises a rubber composition of the present invention is disposed at a height (h) from the bottom of a groove of a block in a range of 40% to 80% of the distance(t) from the bottom to the top of the groove of a block, as shown in FIG. 1. In other words, it is preferable that the relation expressed by the following equation is satisfied: (h/t)×100= 40 to 80 (%). This condition is preferable so that the base layer 12 having an excellent wet-road property and excellent ride quality is exposed to the surface in the intermediate to final periods of tire use to compensate for the decrease in the wet-road property by the decrease in the volume of a groove and decrease in ride quality by the increase in the stiffness of a block. When h/t is less than 40%, the time allowed before exposure of slip marks is very short and insufficient as a period for improving the wet-road property and ride quality. When h/t exceeds 80%, the time allowed before exposure of the rubber base layer is insufficient for exhibiting the proper performance of the rubber cap layer 14.

It is advantageous that the rubber composition of the base layer contains the vulcanization accelerator represented by general formula (I) in an amount of 0.5 to 5.0 parts per 100 parts by weight of the rubber component. When the amount is less than 0.5 parts by weight, aging of the rubber component cannot be suppressed during the period when the rubber component is buried inside of the tread. When the amount exceeds 5.0 parts by weight, no further increase in the effect can be found, and the amount is not preferable from the standpoint of economy.

$R^1$ and $R^2$ in general formula (I) representing the vulcanization accelerator used in the other aspect of the present invention can be defined as described previously in the first aspect.

When the effect of the other aspect of the present invention, i.e., that the wet-road property and ride quality are maintained till the intermediate to final periods of tire use, is taken into consideration, the base layer is preferably prepared in accordance with a formulation exhibiting a wet-road property and ride quality more excellent than those of the formulation for the cap layer. It is preferable, for example, that storage modulus (E' value) of the base layer is 95 to 80 as expressed in terms of an index with reference to E' value of the cap layer which is set to 100, wherein E is measured at room temperature at 50 Hz and a dynamic strain of 1%. It is also preferable that internal loss (tan δ) of the base layer is 105 or more as expressed in terms of an index with reference to tan δ of the cap layer which is set to 100, wherein tan δ is measured at 0° C. at 50 Hz and a dynamic strain of 1%.

Figure 2:
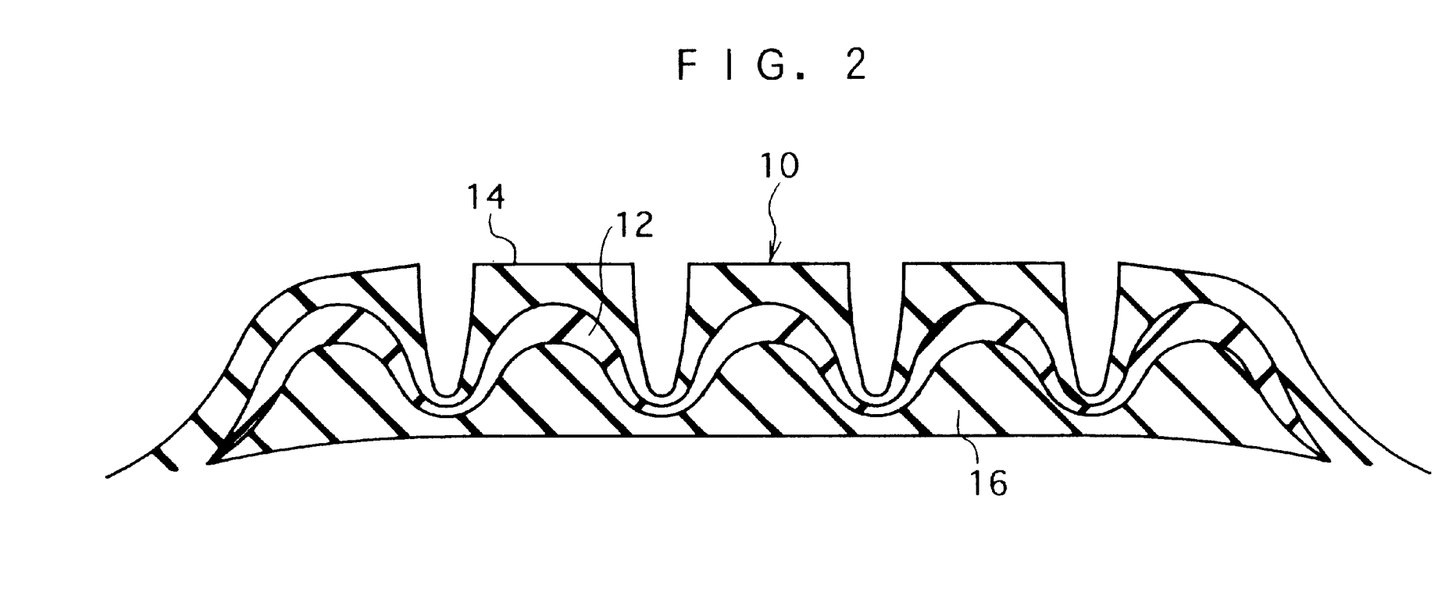
FIG. 2 shows a schematic sectional view of another example of the tread of the pneumatic tire of the present invention.

The stiffness of a block rapidly increases as the height of the block decreases due to abrasion, and this is one of the causes for the lowering in ride quality or the wet-road property (controllability in a critical region, in particular). The other aspect of the present invention is characterized in that a base layer having excellent ride quality, an excellent wet-road property, and less tendency to age is exposed from the inside of the tread part to compensate for the above phenomenon when abrasion proceeds. However, the stiffness of a block is increased as abrasion proceeds even after the base layer has been exposed. Therefore, maintaining properties in the intermediate to final periods of tire use is enabled by constituting the tread with three layers which are a cap layer 14, a base layer 12, and another base layer 16 as shown in FIG. 2, and using rubber compositions having increasingly excellent properties on wet roads and ride quality in the order of from an outer layer to an inner layer. A constitution having still more layers may be considered. However, 3 or 4 can be considered to be the maximum number of the layer in view of the cost of workability. The internal loss (tan δ) can be calculated as a ratio of loss modulus E" to strage modulus E' (E"/E').

EXAMPLES

The invention will be described in more detail with reference to examples and comparative examples below. The present invention is not, however, limited by the examples.

In the examples, part means parts by weight and % means % by weight unless otherwise mentioned.

Examples 1 to 3 and Comparative Examples 1 and 2

Rubber compositions I-1 to I-5 used for pneumatic tires in examples and comparative examples were prepared in accordance with the formulations shown in Table 1 by a conventional method.

Materials shown as follows were used for the rubber compositions:

SBR (A): Tufdene 2530 (trade name); product of Asahi Chemical Industry Co., Ltd.; styrene content, 25%.

SBR(B): 0120 (trade name); product of Japan Synthetic Rubber Co., Ltd.; styrene content, 35%.

Carbon black N135: $N_2SA$, 145 $m^2/g$; DBP absorption,

Carbon black N234: $N_2SA$, 126 $m^2/g$; DBP absorption, 125 $cm^3/100$ g.

Tires of size 225/50R16 having a tread comprising one of rubber compositions I-1 to I-5 shown in Table 1 were prepared and tested using a rim of 8J-16.

Tires were evaluated in accordance with the following methods:

I-A Evaluation of controllability on wet roads

A road test of a tire was conducted on a wet road in a proving ground. An overall evaluation was made by a test driver from the driving property, the braking property, response to steering, and controllability by steering, and controllability on wet roads in the initial period of tire use. Then, a road test of the same tire was conducted on a wet road in accordance with the same method as that conducted above after the tire was used on 20,000 km of an ordinary public road, and controllability on wet roads after use was evaluated.

The results of examples 1 and 2 are shown in an index with reference to controllability on wet roads in the initial period obtained in Comparative Examples 1 and 2 respectively, which are set to 100. The larger the value, the better the controllability on wet roads.

I-B Evaluation of abrasion resistance

A road test was conducted on 20,000 km of an ordinary public road. Abrasion resistance was evaluated by measuring the residual height of grooves of the used tire (the tire after 20,000 km of driving). The results are shown in an index with reference to the result obtained in Comparative Example 2, which is set to 100. The larger the value, the better the abrasion resistance.

The results of evaluations are shown in Table 2.

TABLE 1

| Rubber composition | I-1 | I-2 | I-3 | I-4 | I-5 |
|---|---|---|---|---|---|
| SBR (A) | — | 41.3 | 41.3 | — | 41.3 |
| SBR (B) | 137.5 | 96.3 | 96.3 | 137.5 | 96.3 |
| carbon black | | | | | |
| N135 | 80 | — | — | 80 | — |
| N234 | — | 60 | 60 | — | 60 |
| aromatic oil | 8.0 | 5.0 | 5.0 | 8.0 | 5.0 |
| stearic acid | 1.0 | 1.0 | 1.0 | 1.0 | 1.0 |
| antioxidant[1] | 1.0 | 1.0 | 1.0 | 1.0 | 1.0 |
| wax | 0.2 | 0.2 | 0.2 | 0.2 | 0.2 |
| zinc oxide | 2.5 | 2.5 | 2.5 | 2.5 | 2.5 |
| vulcanizing agent | | | | | |
| sulfur | 2.0 | 2.0 | 2.0 | 2.2 | 2.3 |
| vulcanization accelerator | | | | | |
| DPG[2] | 0.3 | 0.3 | 0.3 | 0.3 | 0.3 |
| DM[3] | — | — | — | 0.6 | 0.6 |
| CZ[4] | 0.8 | 0.8 | 0.8 | 0.8 | 0.8 |
| 4M-DM | 3.5 | 3.5 | — | — | — |
| 5M-DM | — | — | 3.5 | — | — |

4M-DM: bis(4-methylbenzothiazolyl-2)-disulfide
5M-DM: bis(5-methylbenzothiazolyl-2)-disulfide
[1] N-(1,3-dimethylbutyl)-N'-phenyl-p-phenylenediamine
[2] diphenylguanidine
[3] dibenzothiazyl disulfide
[4] N-cyclohexyl-2-benzothiazolyl-1-sulfenamide

TABLE 2

|  | Example | | | Comparative Example | |
| --- | --- | --- | --- | --- | --- |
|  | 1 | 2 | 3 | 1 | 2 |
| rubber composition | I-1 | I-2 | I-3 | I-4 | I-5 |
| abrasion resistance | 105 | 105 | 102 | 100 | 100 |
| wet-road property | | | | | |
| initial property | 100 | 100 | 100 | 100 | 100 |
| after use | 95 | 95 | 90 | 50 | 70 |

As shown in the results in Table 2, pneumatic tires of the present invention all exhibited excellent abrasion resistance and controllability on wet roads and showed almost no decrease in controllability on wet roads after being used on 20,000 km of a road. In contrast, pneumatic tires obtained in Comparative Examples, which did not comprise the vulcanization accelerator used in the present invention, showed markedly decreased controllability on wet roads after being used on 20,000 km of a road, although tires showed excellent controllability on wet roads in the initial period, and it is shown that these tires are inferior in controllability on wet roads after use.

Examples 4 and 5 and Comparative Examples 3 to 8

Rubber compositions II-1 to II-8 used for pneumatic tires in examples and comparative examples were prepared in accordance with the formulations shown in Table 3 by a conventional method.

Materials shown as follows were used for the rubber compositions:

SBR(B): T0120 (trade name); product of Japan Synthetic Rubber Co., Ltd.; styrene content, 35%.

BR: BR01 (trade name); product of Japan Synthetic Rubber Co., Ltd.

Carbon black: Seast 600K (trade name); product of Tokai Carbon Co., Ltd.; $N_2SA$, 154 $m^2/g$; DBP absorption, 120 $cm^3$/100 g.

Silica: Nipsil AQ (trade name); product of Nippon Silica Industrial Co., Ltd.; $N_2SA$, 195 $m^2/g$.

Silane coupling agent: Si-69 (trade name); product of Degussa AG.

Tires of size 205/50R16 having a tread comprising one of rubber compositions II-1 to II-8 shown in Table 3 were prepared and tested using an applied inner pressure of 0.2 MPa.

Tires were evaluated in accordance with the following methods:

II-A Evaluation of controllability on wet roads

A road test was conducted on a wet road in a proving ground. The driving property, the braking property, response to steering, and controllability by steering were evaluated by a test driver. The braking distance was obtained by applying the brake to the tire at a speed of 80 km/hr. From the overall evaluation of these results, controllability on wet roads in the initial period of tire use was obtained. Then, a road test of the same tire was conducted on a wet road in accordance with the same method as that conducted above after the tire was used on a public road until the height of the block reached 50% of the initial hieht, and controllability on wet roads after use was evaluated.

The results of evaluations are shown in an index with reference to controllability on wet roads in the initial period obtained in Comparative Example 3, which is set to 100. The larger the value, the better the controllability on wet roads.

II-B Evaluation of controllability

A road test was conducted on a road in a proving ground. An overall evaluation was made by a test driver from the driving property, the b raking property, response to steering, and controllability by steering, and controllability in the initial period of tire use. Then, a road test of the same tire was conducted in accordance with the same method as those conducted above after the tire was used on a public road until the height of the block reached 50% of the initial height, and controllability after use was evaluated.

The results of evaluations are shown in an index with reference to controllability in the initial period obtained in Comparative Example 3, which is set to 100. The larger the value, the better the controllability.

II-C Evaluation of chipping resistance

A road test was conducted in a proving ground. The condition of a tire tread was observed with respect to chipping after a tire was used for 15 laps to evaluate chipping resistance in the initial period. A road test of the same tire was conducted in accordance with the same method as that above after the tire was used on a public road until the height of the block reached 50% of the initial height, and chipping resistance after use was evaluated. The results of evaluations are shown in an index with reference to chipping resistance in the initial period obtained in Comparative Example 3, which is set to 100. The larger the value, the better the chipping resistance.

The results of evaluations are shown in Table 4.

TABLE 3

|  | Rubber composition | | | | | |
| --- | --- | --- | --- | --- | --- | --- |
|  | II-1 | II-2 | II-3 | II-4 | II-5 | II-6 |
| SBR | 137 | 137 | 137 | 68.5 | 137 | 137 |
| BR | — | — | — | 50 | — | — |
| carbon black | 45 | 45 | 45 | 45 | 45 | 90 |
| silica | 45 | 45 | 45 | 45 | 45 | 0 |
| silane coupling agent[1] | 4.5 | 4.5 | 4.5 | 4.5 | 4.5 | 0 |
| zinc oxide | 3.5 | 3.5 | 3.5 | 3.5 | 3.5 | 3.5 |
| stearic acid | 2.0 | 2.0 | 2.0 | 2.0 | 2.0 | 2.0 |
| antioxidant 6C[2] | 1.0 | 1.0 | 1.0 | 1.0 | 1.0 | 1.0 |
| vulcanization accelerator | | | | | | |
| DPG[3] | 0.3 | 0.3 | 0.3 | 0.3 | 0.3 | 0.3 |
| NS[4] | 0.8 | 0.8 | 0.8 | 0.8 | 0.8 | 0.8 |
| DM[5] | — | — | 0.6 | 0.6 | 0.6 | — |
| vulcanizing agent | | | | | | |
| sulfur | 1.6 | 1.6 | 1.6 | 1.6 | 1.6 | 1.6 |
| vulcanization accelerator | | | | | | |
| 4M-DM | 3.5 | — | — | 3.5 | 6.0 | 3.5 |
| 5M-DM | — | 3.5 | — | — | — | — |

4M-DM: bis(4-methylbenzothiazolyl-2)-disulfide
5M-DM: bis(5-methylbenzothiazolyl-2)-disulfide
[1] bis(3-triethoxysilylpropyl) tetrasulfide
[2] N-(1,3-dimethylbutyl)-N'-phenyl-p-phenylenediamine
[3] diphenylguanidine
[4] N-tert-butyl-2-benzothiazolylsulfenamide
[5] dibenzothiazyl disulfide

TABLE 4

|  | Example | | Comparative Example | | | |
|---|---|---|---|---|---|---|
|  | 4 | 5 | 3 | 4 | 5 | 6 |
| rubber composition | II-1 | II-2 | II-3 | II-4 | II-5 | II-6 |
| wet-road property |  |  |  |  |  |  |
| initial property | 100 | 100 | 100 | 90 | 100 | 85 |
| after use | 95 | 90 | 80 | 85 | 90 | 80 |
| controllability |  |  |  |  |  |  |
| initial property | 100 | 100 | 100 | 90 | 95 | 95 |
| after use | 95 | 90 | 80 | 85 | 80 | 90 |
| chipping resistance |  |  |  |  |  |  |
| initial property | 100 | 100 | 100 | 90 | 80 | 110 |
| after use | 95 | 90 | 75 | 85 | 65 | 105 |

As shown in the results in Table 4, pneumatic tires of the present invention all exhibited excellent controllability on dry and wet roads and chipping resistance and showed almost no decrease in controllability on dry and wet roads or chipping resistance after use. In contrast, pneumatic tires obtained in Comparative Example 3, which did not comprise the vulcanization accelerator of the present invention, showed markedly decreased controllability on wet roads, particularly after use, and also showed a problem in chipping resistance after use in comparison with example 4. The pneumatic tire obtained in Comparative Example 4, which comprised less amount of SBR than what is required for the present invention, showed inferior properties in all the evaluation in comparison to those of Example 4. The pneumatic tire obtained in Comparative Example 5, which comprised the vulcanization accelerator of the present invention in an excessive amount, showed inferior controllability and chipping resistance although the tire showed excellent controllability on wet roads in the initial period. The pneumatic tire obtained in Comparative Example 6, which comprised the vulcanization accelerator used in the present invention but did not comprise silica, showed inferior properties even in the initial period and particularly insufficient controllability on wet roads.

Examples 6 to 10 and Comparative Examples 7 and 8

Components were mixed together in accordance with the formulations shown in Table 5 to obtain rubber compositions A to G. By using combinations of the obtained rubber compositions for a rubber cap layer and a rubber base layer as shown in Table 6, treads composed of two layers having the structure shown in FIG. 1 were prepared, and tires of size 225/50R16 were prepared by using these treads. The road tests of the prepared tires were conducted by using an 8J-16 rim. Measurements were conducted in accordance with the methods described below. The results are shown in Table 6. The upper end of the rubber base layer in all these tires was disposed at a height of 70% of the height of the block.

III-A Property on wet roads

A road test was conducted on a wet road in a proving ground. The overall evaluation of the wet-road property in the initial period of tire use was made by a test driver based on the driving property, the braking property, response to steering, controllability by steering, controllability above the slip limit based on the "feel" (sensed by a test driver), and the braking distance obtained by applying the brake to the tire at a speed of 80 km/hr. Then, the road test of the same tire on a wet road was conducted in accordance with the same method as that conducted above after the tire was used on an ordinary public road in Japan until the height of the block reached 50% of the initial height, and the wet-road property after use was evaluated. The larger the value, the better the wet-road property.

III-B Ride quality

A road test was conducted on various roads having different surface roughness including asphalt, concrete, and Belgian roads in a proving ground. The overall evaluation was made based on the "feel" sensed by a test driver. The evaluation was made with both a new tire and a used tire after the height of the block reached 50% of the initial height. The larger the value, the better the result.

The results of the evaluation are expressed in an index. The results in Examples 6 and 7 are shown with reference to the result in the initial period in Comparative Example 7, which is set to 100. The results in Examples 8 to 10 are shown with reference to the results in the initial period in Comparative Example 8, which is set to 100.

In both the wet-road property and the ride quality, when the difference in the indices, is ±1 to 5, the difference can be detected by a test driver. When the difference is more than ±5, the difference can be detected by general drivers.

For the measurements of E' and tan δ, an apparatus for measurement of viscoelasticity (product of ToyoSeiki Co., Ltd.) was used. The measurement of E' was conducted at room temperature at a frequency of 50 Hz and a dynamic strain of 1%. The measurement of tan δ was conducted at 0° C. at a frequency of 50 Hz and a dynamic strain of 1%. E' and tan δ (E'/tan δ) of a base layer rubber composition was shown in an index with reference to E'/tan of the cap layer rubber composition A used in combination, which is set to 100/100.

TABLE 5

| Rubber composition | A | B | C | D | E | F | G |
|---|---|---|---|---|---|---|---|
| SBR[1] | 55 | 55 | 55 | 96.25 | 96.25 | 96.25 | 96.25 |
| SBR[2] | 82.5 | 82.5 | 82.5 | 41.25 | 41.25 | 41.25 | 41.25 |
| carbon black[3] | 75 | 75 | 75 | 65 | 65 | 65 | 40 |
| silica[4] | — | — | — | — | — | — | 25 |
| silane coupling agent[5] | — | — | — | — | — | — | 2.5 |
| stearic acid | 1 | 1 | 1 | 1 | 1 | 1 | 1 |
| antioxidant[6] | 1 | 1 | 1 | 1 | 1 | 1 | 1 |
| wax | 1.5 | 1.5 | 1.5 | 1.5 | 1.5 | 1.5 | 1.5 |
| zinc oxide | 2.5 | 2.5 | 2.5 | 2.5 | 2.5 | 2.5 | 2.5 |
| vulcanization accelerator |  |  |  |  |  |  |  |
| DPG[7] | 0.3 | 0.3 | 0.3 | 0.3 | 0.3 | 0.3 | 0.3 |
| DM[8] | 0.6 | — | — | 0.6 | — | — | — |
| CZ[9] | 1.0 | 1.0 | 1.0 | 1.0 | 1.0 | 1.0 | 1.0 |
| 4M-DM[10] | — | 3.5 | — | — | 2.0 | — | 2.0 |
| 5M-DM[11] | — | — | — | — | — | 2.0 | — |
| 4M-M[12] | — | — | 2.0 | — | — | — | — |
| sulfur | 2.0 | 1.4 | 1.8 | 1.8 | 1.5 | 1.5 | 1.5 |

[1]Product of Japan Synthetic Rubber Co. Ltd.; trade name: JSR T0120
[2]Product of Japan synthetic Rubber Co. Ltd.; trade name: JSR 1712
[3]Product of Tokai Carbon Co. Ltd.; trade name: Seast 7H
[4]Product of Nippon Silica Industrial Co. Ltd.; trade name: Nipsil AQ
[5]Product of Degussa AG.; trade name: Si69
[6]N-(1,3-dimethylbutyl)-N'-phenyl-p-phenylenediamine
[7]diphenylguanidine
[8]dibenzothiazyl disulfide
[9]N-cyclohexyl-2-benzothiazolylsulfenamide
[10]bis(4-methylbenzothiazolyl-2)-disulfide
[11]bis(5-methylbenzothiazolyl-2)-disulfide
[12]mercapto-4-methylbenzothiazole

TABLE 6

| | Example | | | | | | |
|---|---|---|---|---|---|---|---|
| | 6 | 7 | 8 | 9 | 10 | | |
| | | Comparative Example | | | | | |
| | | 7 | 8 | | | | |
| rubber cap layer composition | A | A | A | A | A | A | A |
| rubber base layer composition | A | B | C | D | E | F | G |
| wet-road property | | | | | | | |
| initial property (index) | 100 | 100 | 100 | 100 | 100 | 100 | 98 |
| after 50% abrasion (index) | 70 | 96 | 84 | 105 | 115 | 113 | 125 |
| ride quality | | | | | | | |
| initial property (index) | 100 | 100 | 100 | 100 | 100 | 100 | 101 |
| after 50% abrasion (index) | 80 | 98 | 90 | 85 | 95 | 92 | 105 |
| E'/tan δ of rubber base layer (index) | 100/100 | 99/100 | 102/99 | 93/103 | 94/104 | 95/103 | 89/108 |

As shown in Table 6, pneumatic tires of the present invention maintained the wet-road property and ride quality with stability till the final period of tire use. Tires which used a rubber composition comprising silica in the base layer showed remarkable improvement in the wet-road property and ride quality.

Little difference was found in the properties of tires in Examples and Comparative Examples in the initial period because the same rubber composition was used in the rubber cap layers of all tires.

As shown by the results of Comparative Examples 7 and 8, tires obtained without using the vulcanization accelerator used in the present invention showed a wet-road property and ride quality after the height of the block reached 50% of the initial height inferior to those of tires obtained in Examples.

What is claimed is:

1. A pneumatic tire comprising a tread which is capable of contacting a road surface, a carcass which is a reinforcing component, and bead cores around which end parts of the carcass are folded to fix the end parts in place and which define the inner dimension of the pneumatic tire, wherein the tread comprises two layers which are a cap layer disposed at the outside in a radial direction of the tire and a base layer disposed inside the cap layer in the radial direction;

the base layer comprises a rubber composition which comprises a rubber component composed of 70% by weight or more of a copolymer of a conjugated diene and a vinyl aromatic hydrocarbon and a remaining amount of another synthetic rubber and/or natural rubber, at least one reinforcing filler selected from the group consisting of carbon black and silica, and at least one vulcanization accelerator represented by one of the following general formulas:

or wherein $R^1$ and $R^2$ each independently represents a hydrogen atom, an alkyl group or an aryl group, excluding the case in which each of $R^1$ and $R^2$ simultaneously represents a hydrogen atom;

wherein the cap layer comprises a rubber composition and the rubber composition of the cap layer is different from that of the base layer;

an upper end of the base layer is disposed at a height from a bottom of a groove adjacent a block in a range of 40% to 80% of the distance from the bottom of the groove to a top of the block;

a storage modulus (E' value) of the base layer is 95 to 80 as expressed in terms of an index based on an E' value of the cap layer which is set as an index of 100; and an internal loss (tan δ) of the base layer is 105 or more as expressed in terms of an index based on a tan δ of the cap layer which is set as an index of 100, which tan δ is measured at 0° C. at 50 Hz and a dynamic strain of 1%.

2. A pneumatic tire according to claim 1, wherein when the group represented by $R^1$ or $R^2$ is an alkyl group. said alkyl group is selected from the group consisting of alkyl groups having 1 to 6 carbon atoms.

3. A pneumatic tire according to claim 2, wherein the alkyl group is a methyl group or an ethyl group.

4. A pneumatic tire according to claim 1, wherein when the group represented by $R^1$ or $R^2$ is an aryl group said aryl group is selected from the group consisting of aryl groups having 6 to 10 carbon atoms.

5. A pneumatic tire according to claim 4, wherein the aryl group is a phenyl group.

6. A pneumatic tire according to claim 1, wherein the vulcanization accelerator is at least one vulcanization accelerator selected from a group consisting of bis (monoalkylbenzothiazolyl-2)-disulfides and 2-mercapto-monoalkylbenzothiazoles.

7. A pneumatic tire according to claim 6, wherein the bis(monoalkylbenzothiazolyl-2)-disulfide is at least one vulcanization accelerator selected from a group consisting of bis(4-methylbenzothiazolyl-2)-disulfide and bis(5-methylbenzothiazolyl-2)-disulfide.

8. A pneumatic tire according to claim 6, wherein the 2-mercapto-monoalkylbenzothiazole is at least one vulcanization accelerator selected from a group consisting of 2-mercapto-4-methylbenzothiazole and 2-mercapto-5-methylbenzothiazole.

9. A pneumatic tire according to claim 1, wherein the carbon black has a specific surface area measured by nitrogen adsorption ($N_2SA$) of 80 to 160 $m^2/g$ and an amount of absorption of dibutyl phthalate (DBP absorption) of 110 to 200 $cm^3/100$ g.

10. A pneumatic tire according to claim 1, wherein the carbon black has a specific surface area measured by nitrogen adsorption ($N_2SA$) of 100 to 160 $m^2/g$ and an amount of absorption of dibutyl phthalate (DBP absorption) of 120 to 200 $cm^3/100$ g.

11. A pneumatic tire according to claim 1, wherein the carbon black has a specific surface area measured by nitrogen adsorption ($N_2SA$) of 100 to 150 $m^2/g$ and an amount of absorption of dibutyl phthalate (DBP absorption) of 130 to 180 $cm^3/100$ g.

12. A pneumatic tire according to claim 1, wherein the reinforcing filler comprises a carbon black and a silica.

13. A pneumatic tire according to claim 12, wherein a total amount of the reinforcing filler is 60 to 120 parts by weight per 100 parts by weight of the rubber component.

14. A pneumatic tire according to claim 1, wherein an amount of of the silica is 20% to 100% by weight of a total amount of the reinforcing filler.

15. A pneumatic tire according to claim 1, wherein the silica has a specific surface area measured by nitrogen adsorption ($N_2SA$) of 190 to 300 $m^2/g$.

16. A pneumatic tire according to claim 1, wherein a content of the vinyl aromatic hydrocarbon in the copolymer of a conjugated diene and a vinyl aromatic hydrocarbon is 30% to 40% by weight of the copolymer.

17. A pneumatic tire according to claim 1, wherein the reinforcing filler comprises carbon black alone.

18. A pneumatic tire comprising a tread which is capable of contacting a road surface, a carcass which is a reinforcing component, and bead cores around which end parts of the carcass are folded to fix the end parts in place and which define the inner dimension of the pneumatic tire, wherein the tread comprises two layers which are a cap layer disposed at the outside in a radial direction of the tire and a base layer dispersed inside the cap layer in the radial direction, the base layer comprises a rubber composition which comprises a rubber component composed of 70% by weight or more of a copolymer of a conjugated diene and a vinyl aromatic hydrocarbon and a remaining amount of another synthetic rubber and/or natural rubber, a reinforcing filler comprising silica, and at least one vulcanization accelerator represented by one of the following general formulas:

wherein $R^1$ and $R^2$ each independently represents a hydrogen atom, an alkyl group, or an aryl group, excluding a case in which each of $R^1$ and $R^2$ simultaneously represents a hydrogen atom, the amount of the reinforcing filler being 45 to 120 parts by weight per 100 parts by weight of the rubber component and the amount of the vulcanization accelerator being 0.5 to 5.0 parts by weight per 100 parts by weight of the rubber component, the cap layer comprises a rubber composition and the rubber composition of the cap layer is different from that of the base layer, an upper end of the rubber base layer is disposed at a height from a bottom of a groove adjacent a block in a range of 40% to 80% of the distance from the bottom of the groove to a top of the block, a storage modulus (E' value) of the base layer is 95 to 80 as expressed in terms of an index based on an E' value of the cap layer which is set as an index of 100, and an internal loss (tan δ) of the base layer is 105 or more as expressed in terms of an index based on a tan δ of the cap layer which is set as an index of 100 which tan δ is measured at 0° C. at 50 Hz and a dynamic strain of 1%.

* * * * *